United States Patent [19]

Hobson, Jr.

[11] 4,121,269
[45] Oct. 17, 1978

[54] GROUND FAULT SIGNAL CIRCUIT FOR CIRCUIT BREAKER TRIP UNIT

[75] Inventor: Charles F. Hobson, Jr., Southington, Conn.

[73] Assignee: General Electric Company, New York, N.Y.

[21] Appl. No.: 794,700

[22] Filed: May 6, 1977

[51] Int. Cl.² ............................................. H02H 3/28
[52] U.S. Cl. .................................... 361/44; 361/47; 361/97
[58] Field of Search ...................... 361/42, 44, 47, 48, 361/93, 96, 97

[56] References Cited

U.S. PATENT DOCUMENTS

| | | | |
|---|---|---|---|
| 3,328,638 | 6/1967 | Reis | 361/73 |
| 3,329,870 | 7/1967 | DeViney et al. | 361/95 |
| 3,713,005 | 1/1973 | Engel | 361/96 |
| 3,786,311 | 1/1974 | Hobson, Jr. et al. | 361/44 |
| 3,959,695 | 5/1976 | Shimp | 361/98 |

FOREIGN PATENT DOCUMENTS

464,040  4/1975  U.S.S.R. ..................................... 361/93

*Primary Examiner*—Harry E. Moose, Jr.
*Attorney, Agent, or Firm*—Robert A. Cahill; Walter C. Bernkopf; Frank L. Neuhauser

[57] ABSTRACT

Separate current transformers sense the individual currents flowing in each conductor of a distribution circuit. A full wave rectifying network includes a plurality of parallel pairs of like poled, series diodes connected between a pair of buses. One corresponding side of each transformer secondary is connected to the junction between a different diode pair. A series circuit consisting of an additional pair of like poled diodes and a burden resistor is also connected between the buses. The corresponding other sides of the transformer secondaries are connected in common to the junction between the additional diode pair. A voltage is developed across the burden resistor only upon the existence of an imbalance in the currents flowing in the distribution circuit.

4 Claims, 1 Drawing Figure

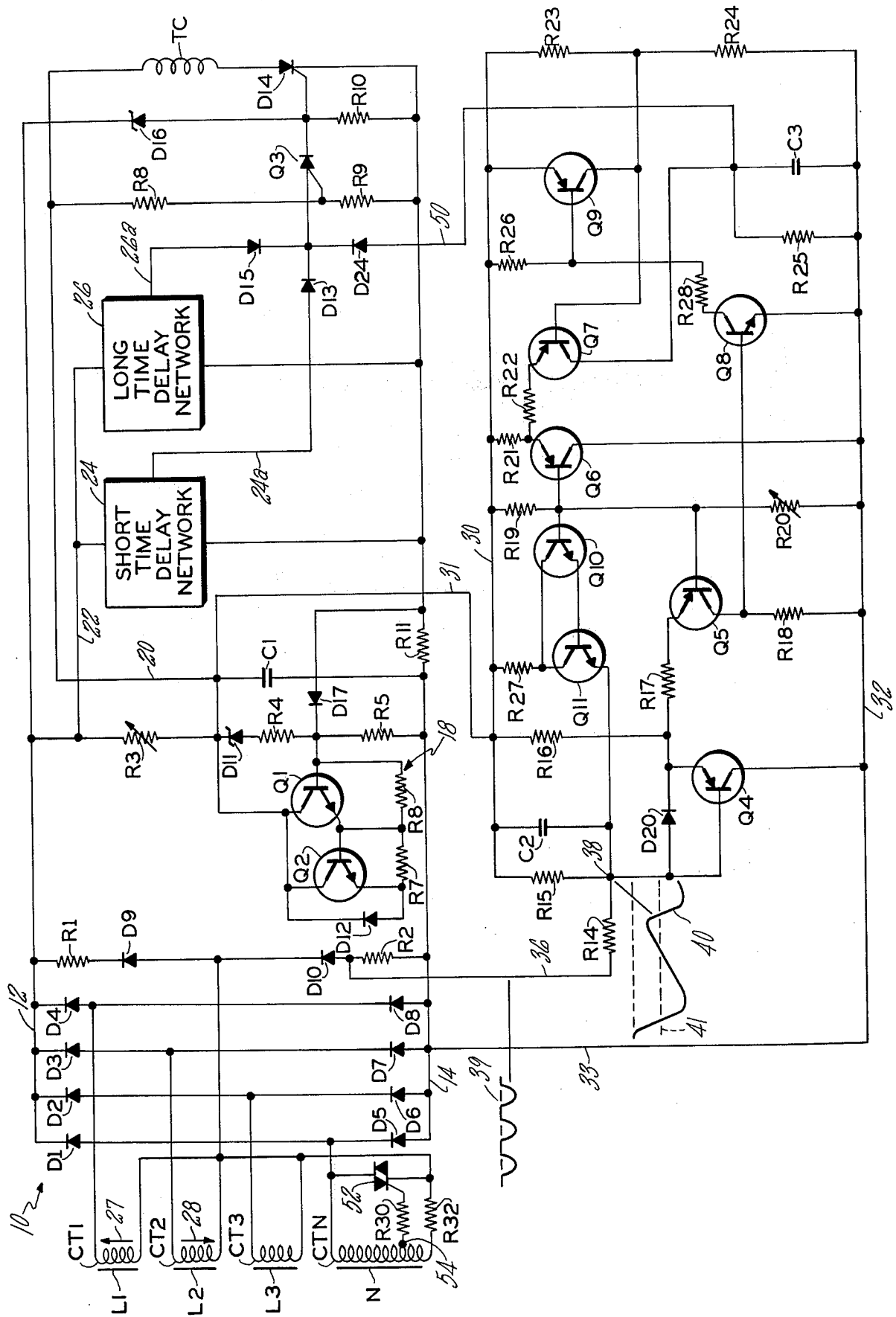

GROUND FAULT SIGNAL CIRCUIT FOR CIRCUIT BREAKER TRIP UNIT

BACKGROUND OF THE INVENTION

With the advent of solid state or electronic trip units for application in industrial circuit breakers to respond to overcurrent conditions ranging from overload to short circuit, it is now common to add the capability of responding to a ground fault condition. To sense overcurrent, a current transformer is coupled with each phase of a distribution circuit such as to develop a secondary output signal voltage proportional to the current flowing in that phase. These signal voltages are then processed to determine if the current in any phase is of overcurrent proportions. When an overcurrent condition is found to exist, a trip function is initiated with or without delay, depending on the magnitude of the sensed overcurrent.

To sense a ground fault condition, the total current flowing in the distribution circuit from the source to the load is compared with the total current returning from the load to the source. A ground fault exists if an imbalance or inequality in these currents is found, since some of the current leaving the source is then flowing through the ground fault and returning to the source via an extraneous ground path. One way of detecting this imbalance is to link the distribution circuit conductors with a differential current transformer core and look for a voltage induced in a secondary winding by residual flux flowing in the core as occasioned by an imbalance in the currents flowing to and from the load. Such a differential transformer must necessarily be large and relatively expensive in order to link with the plural line conductors of a polyphase distribution circuit, as well as the neutral conductor if present. Moreover, the secondary output must be handled by a separate input section, apart from the input section handling the secondary outputs from the phase overcurrent sensing transformers.

An alternative approach to ground fault sensing is to interconnect the secondary windings of the phase current transformers and the neutral current transformer, if a neutral conductor is present, in a summing circuit. If the summation of these secondary currents is zero, there is no ground fault condition present. However, if the summation of these secondary currents is not zero, then a ground fault condition is indicated. Prior executions of this approach have typically resulted in rather complex input section including multiple full wave rectifying networks and various circuit provisions for separating overcurrent information from ground fault information as manifested by the current transformer secondary outputs.

It is accordingly an object of the present invention to provide an improved input section for interfacing a plurality of current sensors with overcurrent trip and ground fault trip circuit networks included in a circuit breaker electronic trip unit.

An additional object is to provide a circuit breaker trip unit having an input section of improved construction for developing a ground fault signal proportional to the magnitude of ground leakage current.

Still another object of the invention is to provide a trip unit input section of the above-character for handling both the ground fault and overcurrent information contents in the outputs of the current sensors.

A further object is to provide a circuit breaker trip unit input section of the above-character which is efficient in design and reliable in operation.

Other objects of the invention will be part be obvious and in part appear hereinafter.

SUMMARY OF THE INVENTION

In accordance with the present invention, there is provided a solid state, electronic trip unit for circuit breakers which is capable of serving both overcurrent and ground fault trip functions. The trip unit includes a separate current sensor in the form of a current transformer which is linked to each conductor of an electrical distribution circuit. More specifically, each conductor constitutes the primary winding of a different one of the current transformers such that separate currents are induced in the individual secondary windings of magnitudes proportional to the respective current flowing in the circuit conductors. The trip unit further includes an input section having a full wave rectifying network consisting of parallel pairs of like poled, series diodes connected between a pair of buses. One corresponding side of each transformer secondary is connected to the junction between a different diode pair. An additional pair of like poled, series diodes is connected through a first resistor to one of the buses and through a like valued second resistor to the other of the buses. The corresponding other sides of the transformer secondaries are connected in common to the junction between the additional diode pair. The buses are connected to provide operation power for the trip unit, as well as overcurrent signal information to the overcurrent trip initiating circuitry.

In the absence of a ground fault on the distribution circuit, the currents developed in the transformer secondaries flow to and from the trip unit exclusively via the full wave rectifying network. That is, all of the currents flowing into the trip unit from the various transformer secondaries via the rectifying network find return paths back to the transformer secondaries exclusively via the rectifying network, and thus the summation of these currents around the loop is zero. However in the event of a ground fault, a current proportional to the ground leakage current magnitude is forced to flow through one of the first and second resistors during positive half cycles and through the other resistor during negative cycles in order to return to the transformer secondaries. One of these resistors is utilized as a burden resistor for developing a ground fault signal voltage for application to the ground fault trip initiating circuit of the trip unit.

The invention accordingly comprises the features of construction, combination of elements and arrangement of parts which will be indicated in the claims.

For a better understanding of the nature and objects of the invention, reference should be had to the following detailed description taken in conjunction with the accompanying drawing, in which the sole FIGURE is a schematic diagram, partially in block form, of a circuit breaker trip unit constructed in accordance with a preferred embodiment of the present invention.

DETAILED DESCRIPTION

Referring to the drawing, a solid state trip unit is disclosed for incorporation in a circuit breaker pursuant to providing overcurrent and ground fault protection for a four-wire power distribution circuit consisting of three line conductors L1, L2 and L3, plus a neutral conductor N. The currents in the three line conductors and neutral conductor are individually sensed by current transformers CT1, CT2, CT3 and CTN, respectively. The multi-turn secondary windings of these current transformers are connected to a diode rectifying network, generally indicated at 10, which includes diodes D1 through D4, whose cathodes are connected in common to a bus 12, and diodes D5 through D8, whose anodes are connected in common to a bus 14. The anodes of diodes D1 through D4 are respectively connected to the cathodes of diodes D5 through D8. The upper terminal of the secondary winding of current transformer CT1 is connected to the junction between diodes D4 and D8, the upper terminal of current transformer secondary CT2 is connected to the junction between diodes D3 and D7, the upper terminal of transformer secondary CT3 is connected to the junction between diodes D2 and D6, and the upper terminal of transformer secondary CTN is connected to the junction between diodes D1 and D5. The lower terminals of the four current transformer secondary windings are connected in common to the junction between diodes D9 and D10, with the cathode of diode D9 connected to bus 12 through a resistor R1 and the anode of diode D10 connected to bus 14 through a resistor R2. As will be seen, resistor R2 constitutes the burden resistor for a ground fault trip network, generally indicated at 16, while resistor R1 counterbalances the presence of resistor R2 such that the input impedance seen by the current transformers is uniform for both positive and negative half cycles of the line currents.

It will be understood that the disclosed solid state trip unit is equally adaptable to a three-wire distribution circuit, wherein the neutral conductor N is omitted, simply by omitting the neutral current transformer CTN and diodes D1 and D5.

Bus 12 is connected to bus 14 through the series combination of a variable resistor R3, a Zener diode D11, a resistor R4 and a resistor R5. The junction between resistor R3 and Zener diode D11 is by-passed to bus 14 by a shunt voltage regulator, generally indicated at 18. Specifically, this shunt voltage regulator includes a transistor Q1 whose collector is connected to the junction between resistor R3 and Zener diode D11, while its base is connected to the junction between resistors R4 and R5. A second transistor Q2 has its collector connected in common with the collector of transistor Q1 and its base connected in common with the emitter of Q1. The emitter of transistor Q2 is connected to bus 14 and also to its collector via a diode D12. The base of transistor Q1 is connected to the emitter of transistor Q2 through the series combination of resistors R6 and R7, with the junction therebetween connected to the junction between the base of transistor of Q2 and the emitter of transistor Q1.

The function of Zener diode D11 together with shunt voltage regulator 18 is to impose a regulated positive voltage of, for example, 30 volts on a supply bus 20 connected to the junction between Zener diode D11 and resistor R3. When the voltage on bus 12, which is a full wave rectified voltage proportional to the currents flowing in the distribution circuit, exceeds the breakdown voltage of Zener diode D11, current flows through resistor R4 to provide base current for transistors Q1 and Q2. These transistors turn on to shunt current flowing from bus 12 through resistor R3 around Zener diode D11 via the collector-emitter circuit of power transistor Q2. As the signal voltage on bus 12 further increases, more base current for transistor Q1 flows through diode D11 and resistor R4, increasing the conductance of transistor Q2 to divert more current to bus 14. The net result is to hold the positive voltage on bus 20 to the predetermined regulated supply level. An energy storage capacitor C1, connected between bus 20 and bus 14, is charged to this regulated voltage level.

Variable resistor R3 serves as a burden resistor for developing an overcurrent signal voltage superimposed on the regulated positive voltage level appearing on bus 20. This overcurrent signal voltage is supplied in common over bus 22 to a short time delay network 24 and a long time delay network 26. Resistor R3 is adjusted to a resistance value tailored to the current rating of the electrical load to be protected. Thus, when the load current rating is exceeded, a signal voltage proportional to the magnitude of the overcurrent is supplied to networks 24 and 26. Network 24 would typically include adjustable means for establishing a desired short time delay pick-up point. That is, this network is adjusted to a predetermined multiple of from four to eight times rated current, for example. If the overcurrent signal voltage on bus 22 exceeds the short time delay pick-up point established by network 24 and remains so for a predetermined short time delay, network 24 issues a trip signal voltage which is communicated over lead 24a and through an isolating diode D13 to the anode of a programmable unijunction transistor Q3. The voltage of this trip signal is such as to exceed the gate voltage developed at the junction of resistors R8 and R9 connected as a voltage divider across buses 20 and 14. The unijunction transistor Q3 is thus triggered into conduction to develop a triggering voltage across resistor R10 sufficient to fire a thyristor in the form of a silicon controlled rectifier D14. With silicon controlled rectifier D14 conducting, current is drawn from bus 20 through a trip coil TC which operates to effect tripping of the circuit breaker and interruption of the distribution circuit. It will be noted that the energizing current for the trip coil is derived from the current flowing through resistor R3 supplemented by discharge current from capacitor C1.

If the overcurrent signal voltage on bus 22 is representative of an overcurrent condition less than the pick-up point established by a short time delay network 24, the long time delay network 26 is relied upon to initiate a trip function after a time delay which is inversely proportional to the square of the overcurrent magnitude. Should the functioning of the long time delay network determine that a trip function is called for, a trip signal voltage is developed on lead 26a for application through an isolating diode D15 to the anode of programmable unijunction transistor Q3. This transistor fires to trigger silicon controlled rectifier D14 into conduction, and energizing current is drawn through the trip coil TC pursuant to effecting interruption of the distribution circuit. The short and long time delay networks may be of the construction shown in U.S. Pat. No. 3,786,311.

Should the overcurrent signal voltage on bus 12 be indicative of overcurrents of short circuit proportions, for example ten times rated current, an instantaneous trip function is initiated. This is achieved simply by connecting bus 12 to the gate of silicon controlled rectifier D14 through a Zener diode D16. This Zener diode is selected to have a threshold voltage which is exceeded by an overcurrent signal voltage on bus 12 indicative of short circuit currents flowing in the distribution circuit, and the resulting breakdown of the Zener diode achieves a direct and essentially instantaneous triggering of the silicon controlled rectifier D14 to draw energizing current through trip coil TC.

Since energizing current for the trip coil is derived via the current transformers from the currents flowing in the distribution circuit, high magnitude fault currents can produce excessive current flow through the trip coil. This is particularly significant if the trip coil is part of a flux shifting circuit breaker trip device. Excessive currents can cause reverse magnetization such that the plunger of the trip device will not be released to trippingly engage the circuit breaker latch. Consequently, the circuit breaker does not trip under severe fault conditions, an extremely serious situation. To prevent this situation from occuring, a small resistor R11 is connected in bus 14. The right end of this resistor is connected by a diode D17 directly to the base of transistor Q1 of shunt voltage regulator 18. When the current flowing through the trip coil from bus 20 and returning through bus 14 develops a sufficient voltage drop across resistor R11 to forward bias diode D17, additional base current is supplied to transistor Q1. This transistor goes further into conduction, as does transistor Q2, and excessive energizing current is diverted from the trip coil via the voltage regulator 18.

As noted above, resistor R2 constitutes the burden resistor for the ground fault trip network 16. As is well understood, a ground fault on the distribution circuit is manifested by an imbalance in the currents flowing in the three line conductors and the neutral conductor of the circuit. That is, under normal conditions, all of the current flowing to the load via the distribution circuit will be balanced by the currents returning from the load via the distribution circuit. However, when the circuit is experiencing a ground fault, some of the current will return to the source by an external ground circuit path, thus creating an imbalance in the currents flowing to and from the load via the line and neutral conductors of the distribution circuit.

To appreciate how a current imbalance occasioned by a ground fault produces a signal voltage across resistor R2, assume that the only current flowing in the distribution circuit is through line L1. This current produces a secondary current flowing in the assumed direction indicated by arrow 27 during positive half cycles. This secondary current then flows out the upper side of transformer secondary CT1 and through diode D4 onto bus 12. It will be observed that the only way this current can return to the lower side of current transformer secondary CT1 is through resistor R2 and diode D10. During a negative half cycle, the direction of the secondary current reverses, and the current flows out the lower side of current transformer secondary CT1 through diode D9 and resistor R1 to bus 12. The current returns to the upper side of the current transformer secondary CT1 through diode D8. It can be shown that for any differential in the currents induced in the current transformer secondaries, the current differential will flow through burden resistor R2 and through balancing resistor R1 during alternate half cycles.

To illustrate that a balanced current condition does not produce a voltage signal across resistor R2, assume that all of the current flowing in line conductor L1 to the load returns to the source through line conductor L2. The direction of the current induced in current transformer secondary CT1 is represented by the arrow 27, while the direction of the current induced in current transformer secondary CT2 is represented by the arrow 28. During one half cycle, the current 27 flows through diode D4 onto bus 12, while the current 28 flows out the lower side of current transformer secondary CT2 and into the lower side of current transformer secondary CT1. The return current on bus 14 flows through diode D7 to the upper side of current transformer secondary CT2, completing the current loop for the secondary currents 27 and 28. During the next half cycle, the directions of the currents 27 and 28 reverse. Current 27 flows out the lower side of current transformer secondary CT1 and into the lower side of current transformer secondary CT2. Current 28 flows out the upper side of current transformer secondary CT2 and onto bus 12 through diode D3. This current returns via bus 14 and diode D8 to the upper side of current transformer seondary CT1, completing the current loop. It is seen that under balanced current conditions, no current flows through resistors R1 and R2, and consequently no ground fault signal voltage is developed across resistor R2 for application to the ground fault trip circuit 16.

The ground fault trip network 16 includes a positive voltage supply bus 30 to which the regulated supply voltage on bus 20 is applied over lead 31. The essentially zero voltage reference level developed on bus 14 is applied over lead 33 to bus 32 of the ground fault trip network. The upper terminal of burden resistor R2 is connected via a lead 36 and a resistor R14 to an input terminal 38 of the ground fault trip network 16. This input terminal is referenced to the positive voltage bus 30 by resistor R15. It is seen that the resistors R2, R14 and R15 constitute a voltage divider connected between the zero voltage bus 14, which is common to bus 32, and the positive voltage supply bus 30. It will also be noted that any current flowing through burden resistor R2 occasioned by a current imbalance in the distribution circuit flows upwardly from bus 14 through diode D10, thus creating a voltage drop across this burden resistor which is negative with respect to the zero reference voltage on bus 14. This negative half-wave ground fault signal voltage, indicated graphically at 39, pulls the voltage at ground fault trip network input terminal 38 downwardly from its normal quiescient bias voltage level. A capacitor C2 is connected across resistor R15 to partially filter the negative going voltage fluctuations at junction 38, thus creating a negative going ripple signal voltage, as graphically illustrated at 40. This negative ripple voltage 40 is applied to the base of a transistor Q4 which is connected with resistor Q5 as a differential amplifier. The emitter of transistor Q4 is connected to bus 30 through a resistor R16 and to emitter of transistor Q5 through a resistor R17. The collector of transistor Q4 is connected directly to bus 32, while the collector of transistor Q5 is connected to bus 32 through resistor R18. A diode D20, connected between the base and emitter of resistor Q4, is poled to prevent reverse biasing of the base emitter junction of this transistor.

A voltage divider consisting of resistors R19 and R20 is connected between buses 30 and 32 of the ground fault trip network 16. Resistor R20 is a variable resistor which is adjusted to establish an appropriate bias voltage for application to the base of transistor Q5 pursuant to establishing a desired ground fault signal pick-up voltage. This bias voltage is also applied to the base of a transistor Q6 which is connected with transistor Q7 as a differential amplifier. The emitter of transistor Q6 is connected to bus 30 through a resistor R21 and to the emitter of transistor Q7 through a resistor R22. The collector of transistor Q6 is connected directly to bus 32, while the collector of transistor Q7 is connected to bus 32 through the parallel combination of a capacitor C3 and a resistor R25. The base of transistor Q7 is connected to the junction of resistors R23 and R24 connected as a voltage divider across buses 30 and 32. Resistor R23 is shunted by the collector-emitter circuit of a transistor Q9. The base of this transistor is connected to bus 30 through resistor R26 and to bus 32 through resistor R27 and the collector-emitter circuit of transistor Q8. The base of transistor Q8 is connected directly to the collector of transistor Q5.

In the absence of a ground fault ripple signal voltage, the quiescent voltage at input terminal 38 is at a level to bias transistor Q4 to a low conductive or essentially non-conductive state. On the other hand, transistor Q5 is biased into conduction by the voltage developed at the junction between resistors R19 and R20, and current is drawn from bus 30 through resistor R16, resistor R17 and the emitter-collector circuit of this transistor. Consequently, base drive current is available for transistor Q8, and this transistor goes into conduction to turn transistor Q9 on, which, in turn, biases transistor Q7 off. With transistor Q7 non-conductive, no current is available to charge timing capacitor C3. As a consequence, capacitor C3 is not charged, and there is no trip signal voltage developed thereacross for application over lead 40 and through diode D24 to fire unijunction transistor Q3 pursuant to triggering silicon controlled rectifier D14 to initiate a ground fault trip function.

Upon the occurrence of a ground fault in the distribution circuit, the negative ripple voltage 40 draws the voltage at input terminal 38 downwardly below the pick-up level effectively established by the adjusted resistance value of resistor R20, driving transistor Q4 into conduction. Transistor Q4 thus diverts collector current from transistor Q5, thereby depriving transistor Q8 of its source of base drive current. Transistor Q8 thus turns off, forcing transistor Q9 into non-conduction. The shunt around resistor R23 is thus removed to restore base bias for transistor Q7. This transistor goes into conduction to supply charging current for capacitor C3. The magnitude of this charging current is determined by the voltage difference between the base of transistor Q6 and the base of transistor Q7, divided by the value of resistor R22. At this point, it is significant to note that the resistance setting of resistor R20 determines the voltage at the base of transistor Q6, which then establishes the magnitude of charging current for timing capacitor C3. Consequently, resistor R20, in addition to establishing the pick-up level for the ground fault ripple signal voltage, also establishes the charging current magnitude for timing capacitor C3.

Considering the waveform 40 of the ground fault ripple signal voltage, transistor Q4 is rendered conductive only during the time that the ripple voltage peaks are negative relative to the pick-up voltage level, indicated at 41. On the other hand, during the valleys of the ripple voltage waveform 40, the pick-up voltage level 41 is more negative, and transistor Q4 is biased off, again making base drive current for transistor Q8 available at the collector of transistor Q5. Transistor Q8 turns on to disable the source of charging current for capacitor C3. A portion of the charge accumulated on this capacitor leaks off at a rate determined by the value of resistor R25. When the ground fault ripple signal voltage goes into its next negative half cycle, the pick-up voltage level is again exceeded, and transistor Q4 turns on. Transistor Q8 again turns off, and an additional increment of charge is accumulated on the timing capacitor C3. It is seen that the time interval during which the ripple peaks are more negative than the pick-up voltage level increases as the ground fault signal amplitude increases. Consequently, the charging time interval for timing capacitor C3 increases, and this capacitor charges more rapidly to the voltage necessary to fire unijunction transistor Q3 pursuant to initiating a trip function. On the other hand, if the ground fault signal decreases in amplitude, the interval during which the negative peaks of the ground fault ripple signal voltage are more negative than the pick-up voltage level decreases. Consequently, the charging intervals for capacitor C3 are shortened, and it is charged by the collector current from transistor Q7 at a slower rate. Of course, for a given ground fault signal amplitude, raising the pick-up voltage level 41 increases both the charging current magnitude and the duration of each charging current interval, while a lowering of the pick-up voltage level decreases both the charging current magnitude and the duration of each charging current interval.

It is seen that transistors Q8, Q9 and Q7 function as a variable duty cycle switch for controlling the charging and discharging rates of capacitor C3 in accordance with the amplitude of the ground fault ripple signal voltage in relation to the pick-up voltage level established by the setting of resistor R20, which setting also establishes the charging current magnitude. Thus, the rate at which capacitor C3 is charged pursuant to developing a voltage sufficient to fire programmable unijunction transistor Q3 is determined by the ground fault signal amplitude.

It is deemed desirable, in order to discourage nuisance tripping, to establish a maximum charging rate for capacitor C3, such that under severe ground fault conditions, an appropriate minimum delay is instituted before a ground fault trip function is initiated. To this end, means are provided to limit the magnitude of voltage fluctuation at the ground fault trip network input terminal 38 in the face of large peak amplitude ground fault signal voltages developed across burden resistor R2. Specifically, a voltage clamp in the form of Darlington connected transistors Q10 and Q11 is connected between the junction of resistors R10 and R20 and the network input terminal 38. Thus, the base of transistor Q10 is connected to the junction of resistors R19 and R20, while its emitter is directly connected to the base of transistor Q11. The collectors of these transistors are connected in common through a resistor R27 to bus 30. The emitter of transistor Q11 is connected directly to network input terminal 38. It is thus seen that the junction between resistors R19 and R20 is connected to network input terminal 38 through the base emitter junctions of transistors Q10 and Q11. As a consequence, the input terminal 38 is prevented from falling in excess of two diode voltage drops below the voltage established at the junction of resistors R19 and R20 which, in turn, establishes the pick-up voltage level 41. This clamping action in effect limits the relative peak amplitude of the ground fault ripple signal voltage 40 seen at network input terminal 38 to a predetermined maximum in the face of ground fault signal voltages of higher peak amplitudes developed across burden resistor R2. As a result, a maximum duty cycle is established for the capacitor charging switch, which, for a given pick-up voltage level 41, is reflected in a predetermined maximum charging rate of capacitor C3. Accordingly, an appropriate minimum delay is imposed prior to initiating a ground fault trip function.

While the disclosed ground fault trip network 16 utilizes a common adjustment (resistor R20) for establishing the ground fault pick-up level and the magnitude of charging current for capacitor C3, it will be understood that, for a wider range of adjustability, these two settings could be established separately.

In a typical configuration, the current transformers CT1, CT2 and CT3 are packaged within the circuit breaker and thus can be readily, permanently wired into the solid state trip unit. The neutral transformer CTN, on the other hand, is typically mounted externally of the circuit breaker, thus necessitating external wiring of its secondary leads into the trip unit circuitry. Consequently, there is a significant risk that this external wiring may break, resulting in open circuiting of the neutral transformer secondary. With current flowing in the neutral conductor N, a potentially hazardous high voltage condition can exist across the open circuited secondary winding of the neutral transformer CTN. This high voltage condition presents an electrical shock hazard to personnel, as well as a hazard to the secondary winding insulation.

To protect against this contingency, a bi-directional thyristor or Triac 52 is connected across the secondary winding of neutral transformer CTN. The gate of this Triac is connected to a tap 54 on the neutral transformer secondary winding through a current limiting resistor R30. A resistor R32 is connected between the lower end of the neutral transformer secondary winding and the main terminal one or reference terminal of Triac 52.

During normal operation with the neutral transformer secondary leads intact, the current flowing through resistor R32 will produce a voltage in opposition to the voltage appearing at transformer tap 54. As a consequence, the effective gate voltage applied to Triac 52 is reduced, such that triggering is inhibited during normal operation. However, if the neutral transformer secondary winding should become open circuited, there is no voltage developed across resistor R32. When the open circuit voltage across the neutral current transformer secondary exceeds a predetermined value, for example 50 volts, the gate voltage at tap 54 is sufficient to trigger Triac 52 into conduction. As a consequence, the neutral current transformer secondary winding is short-circuited through Triac 52, thus eliminating the open circuited high voltage hazard.

It will be appreciated that the other current transformer secondary windings may also be equipped with Triac 52 should it be determined that the risks of their becoming open circuited is significant.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An electronic trip unit for a circuit breaker operating to protect a distribution circuit against both overcurrent and ground fault conditions, said trip unit comprising, in combination:
   A. a current transformer linked to each conductor of the distribution circuit and having a secondary winding in which is developed a current signal proportional to the current flowing in the conductor;
   B. first and second buses;
   C. a full wave rectifying network including plural pairs of like poled, series diodes connected in parallel between said first and second buses, one corresponding side of each transformer winding connected to the junction between a different diode pair;
   D. an additional pair of like poled diodes and a single burden resistor connected in series between said first and second buses, the corresponding other sides of said transformer secondary windings connect in common to the junction between said additional diode pair,
   1. whereby, in the event of a ground fault on the distribution circuit, a component of the currents developed in said secondary windings flows through said burden resistor to develop a half-wave rectified signal voltage thereacross directly proportional in magnitude to the distribution circuit current flowing through the ground fault; and
   E. ground fault circuitry having its input connected directly across said burden resistor for processing said signal voltage.

2. The trip unit defined in claim 1, wherein said additional diode pair is connected to one of said first and second buses through said burden resistor and to the other of said first and second buses through an input impedance balancing resistor.

3. The trip unit defined in claim 1, which further includes an additional burden resistor connected in circuit between said first and second buses for developing a signal voltage proportional to the magnitudes of the currents flowing in the distribution circuit conductors, and overcurrent responsive circuitry connected to process said signal voltage developed across said additional burden resistor.

4. The trip unit defined in claim 3, wherein said additional diode pair is connected to one of said first and second buses through said burden resistor and to the other of said first and second buses through an input impedance balancing resistor.

* * * * *

UNITED STATES PATENT OFFICE
CERTIFICATE OF CORRECTION

Patent No. 4,121,269          Dated October 17, 1978

Inventor(s) Charles F. Hobson, Jr.

It is certified that error appears in the above-identified patent and that said Letters Patent are hereby corrected as shown below:

The drawing figure should be corrected to read as shown on the attached sheet.

Signed and Sealed this

*Twenty-seventh* Day of *February 1979*

[SEAL]

*Attest:*

RUTH C. MASON
*Attesting Officer*

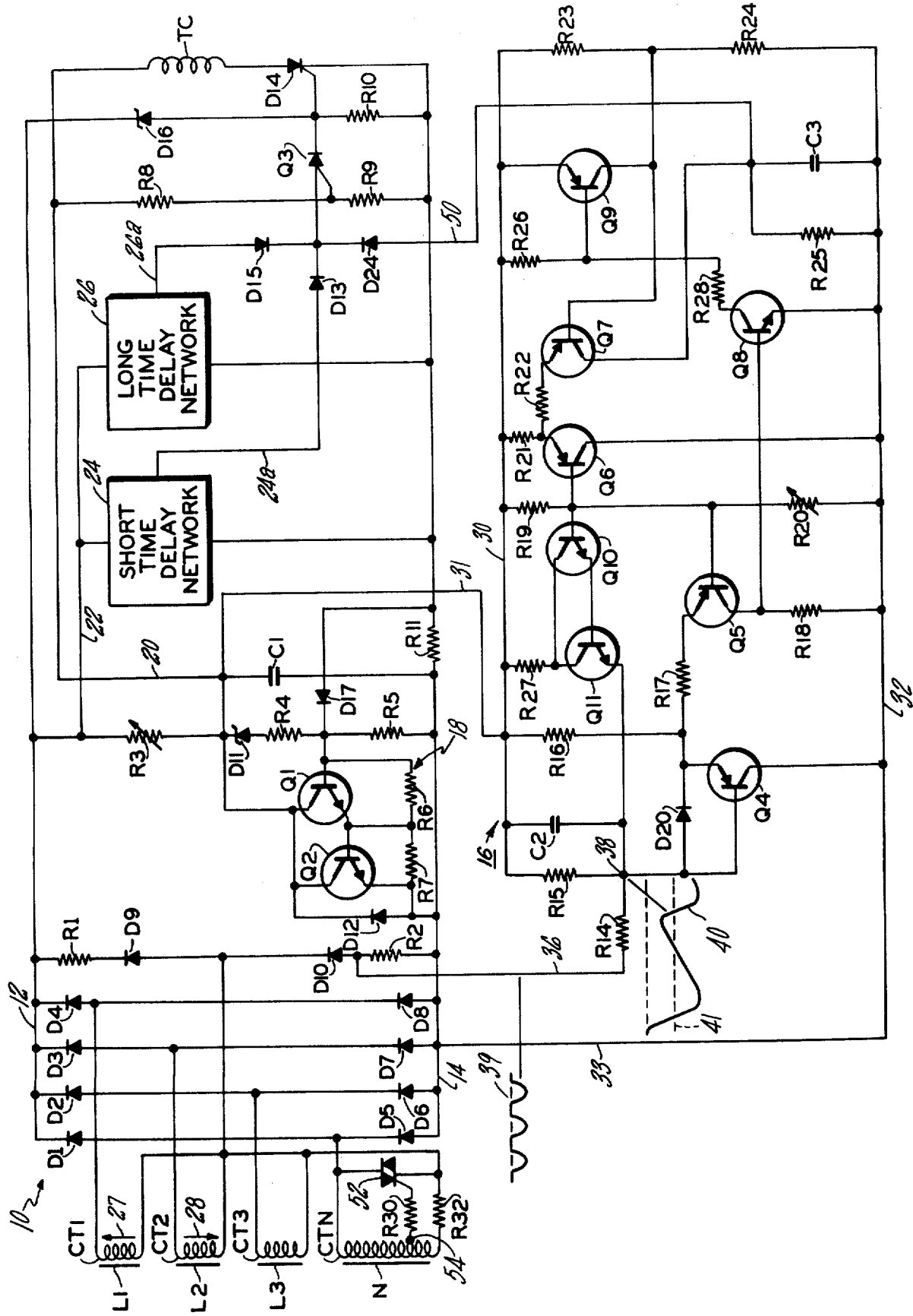

DONALD W. BANNER
*Commissioner of Patents and Trademarks*